(12) United States Patent
Boyle et al.

(10) Patent No.: US 8,583,777 B1
(45) Date of Patent: Nov. 12, 2013

(54) METHOD AND SYSTEM FOR PROVIDING REAL-TIME END-USER WIFI QUALITY DATA

(71) Applicant: Joingo, LLC, San Jose, CA (US)

(72) Inventors: Stephen S. Boyle, Lincoln, CA (US); Russell S. Greer, Los Gatos, CA (US); Maynard Demmon, San Jose, CA (US)

(73) Assignee: Joingo, LLC, San Jose, CA (US)

( * ) Notice: Subject to any disclaimer, the term of this patent is extended or adjusted under 35 U.S.C. 154(b) by 0 days.

(21) Appl. No.: 13/965,596

(22) Filed: Aug. 13, 2013

(51) Int. Cl.
*G06F 15/16* (2006.01)
*G06F 12/00* (2006.01)

(52) U.S. Cl.
USPC .......................................... 709/223; 709/217

(58) Field of Classification Search
USPC .................. 709/203, 217–218, 223–229, 250
See application file for complete search history.

(56) References Cited

U.S. PATENT DOCUMENTS

| | | | |
|---|---|---|---|
| 7,967,212 B1 | 6/2011 | Euler et al. | |
| 2002/0069037 A1 | 6/2002 | Hendrickson et al. | |
| 2009/0313318 A1 | 12/2009 | Dye et al. | |
| 2011/0119370 A1 | 5/2011 | Huang et al. | |
| 2012/0079122 A1* | 3/2012 | Brown et al. | 709/227 |
| 2012/0254804 A1* | 10/2012 | Sheha et al. | 715/834 |
| 2013/0005296 A1* | 1/2013 | Papakostas et al. | 455/405 |
| 2013/0042008 A1* | 2/2013 | Das et al. | 709/226 |
| 2013/0178195 A1* | 7/2013 | Luna et al. | 455/414.1 |

* cited by examiner

*Primary Examiner* — Zarni Maung
(74) *Attorney, Agent, or Firm* — Clause Eight IPS; Michael Catania (57) ABSTRACT

A system and method for providing WiFi operators real-time end-user WiFi quality information is disclosed herein. An application server injects a scriptlet into a content transferred to a web browser of a mobile device during a browsing activity. The scriptlet is configured to run in the background of the browsing activity and configured to periodically test a latency of HTTP requests from the mobile device to the application server to determine a quality of the WIFI network.

6 Claims, 11 Drawing Sheets

METHOD AND SYSTEM FOR PROVIDING REAL-TIME END-USER WIFI QUALITY DATA

CROSS REFERENCES TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

The present invention generally relates to wireless communications. More specifically, the present invention relates to a method and system for providing WiFi operators real-time end-user WiFi quality information.

2. Description of the Related Art

The prior art discusses various systems and methods for providing monitoring parameters for a wireless local area network.

Hendrickson et al., U.S. Patent Publication Number 20020069037 for a System And Method For Measuring Wireless Device And Network Usage And Performance Metrics, discloses a system that uses specific system wireless devices with an installed data gathering software that transmits data to a control center using a wireless link in order to measure the usage and performance of a wireless network.

Euler et al., U.S. Pat. No. 7,967,212 for Web Content Power Consumption Notification For Wireless Devices discloses means for determining if a content download will drain a battery level of a mobile device based on a current power level of a mobile device, the size of the content, and the type of device.

Huang et al., U.S. Patent Publication Number 20110119370 for Measuring Network Performance For Cloud Services discloses a method for a round trip time/latency from a central controller to a cloud service.

General definitions for terms utilized in the pertinent art are set forth below.

APP is a software application for a mobile phone such as a smart phone.

Application Programming Interface (API) is a collection of computer software code, usually a set of class definitions, that can perform a set of related complex tasks, but has a limited set of controls that may be manipulated by other software-code entities. The set of controls is deliberately limited for the sake of clarity and ease of use, so that programmers do not have to work with the detail contained within the given API itself.

BLUETOOTH technology is a standard short range radio link that operates in the unlicensed 2.4 gigaHertz band.

Code Division Multiple Access ("CDMA") is a spread spectrum communication system used in second generation and third generation cellular networks, and is described in U.S. Pat. No. 4,901,307.

CRM (Customer Relationship Management) is a widely-implemented strategy for managing a company's interactions with customers, clients and sales prospects. CRM involves using technology to organize, automate, and synchronize business processes and the like—principally sales activities, but also business processes and the like for marketing, customer service and technical support.

Direct Inward Dialing ("DID") involves a carrier providing one or more trunk lines to a customer for connection to the customer's private branch exchange ("PBX") and a range of telephone lines are allocated to this line.

Domain Name Server ("DNS") is a server on a network that maps domain names to IP addresses.

Freemium is offering a first service free and then if warranted offering a second service for a fee.

FTP or File Transfer Protocol is a protocol for moving files over the Internet from one computer to another.

GSM, Global System for Mobile Communications is a second generation digital cellular network.

Hypertext Transfer Protocol ("HTTP") is a set of conventions for controlling the transfer of information via the Internet from a web server computer to a client computer, and also from a client computer to a web server, and Hypertext Transfer Protocol Secure ("HTTPS") is a communications protocol for secure communication via a network from a web server computer to a client computer, and also from a client computer to a web server by at a minimum verifying the authenticity of a web site.

Internet is the worldwide, decentralized totality of server computers and data-transmission paths which can supply information to a connected and browser-equipped client computer, and can receive and forward information entered from the client computer.

Internet Protocol Address ("IP address") is a unique identifier (using IPv4 or IPv6) for a machine/computer on the Internet.

Interactive voice response ("IVR") is a telephone technology in which a user uses a phone to interact with a database to acquire information.

Java Server Pages ("JSP") is a code embedded directly in a web page, and provides a means for accessing the functionality of complex servlets running on a web server.

JavaScript is an object-based programming language. JavaScript is an interpreted language, not a compiled language. JavaScript is generally designed for writing software routines that operate within a client computer on the Internet. Generally, the software routines are downloaded to the client computer at the beginning of the interactive session, if they are not already cached on the client computer.

Long Term Evolution ("LTE") is a next generation communication network.

Mobile Browser is a web browser designed for use on a mobile communication device such as a mobile phone, is preferably designed to display content a small screen of a mobile phone, and connects to the Internet over a cellular network or a wireless LAN using HTTP over TCP/IP.

Mobile Originated ("MO") is a text message that is sent from a mobile phone.

Mobile Terminated ("MT") is a text message that is sent to a mobile phone.

Multimedia messaging service ("MMS") communication is a communication transmitted to and from a mobile phone that includes a multimedia content such as a digital photograph (JPEG), videos, and the like.

Public Switch Telephone Network ("PSTN") is a telecommunication system in which networks are inter-connected to allow telephones to communicate with each other throughout the world.

Scriptlet is JAVA code embedded (between <%=and %>) in JavaServer Pages which contains JAVA code that is executed every time the JavaServer Page is invoked.

Service Set Identifier ("SSID") is the name of the wireless network.

Short Message Service ("SMS") is text messaging communication using a mobile phone or other device to send messages up to 160 characters in length.

Short message peer-to-peer ("SMPP") is a telecommunications protocol for exchanging SMS messages between SMS peer entities.

Simple object access protocol ("SOAP") is a computer network protocol for exchanging information.

Simple mail transfer protocol ("SMTP") is a delivery protocol for email.

A SMS aggregator is an entity that provides connectivity with a mobile phone carrier by offering a SMS gateway to send and receive messages and other digital content.

A SMS Gateway is used to send text messages with or without a mobile phone, and is used by aggregators to forward text messages to mobile phones.

Telephone Consumer Protection Act ("TCPA") of 1991 restricts the use of SMS text messages received by mobile phones, and SMS messages sent without a consumer's consent can violate the TCPA.

Transfer Control Protocol/Internet Protocol ("TCP/IP") is a protocol for moving files over the Internet.

Voice over Internet Protocol ("VoIP") relates to communications transmitted over the Internet such as SKYPE.

URL or Uniform Resource Locator is an address on the World Wide Web.

User Interface or UI is the junction between a user and a computer program. An interface is a set of commands or menus through which a user communicates with a program. A command driven interface is one in which the user enter commands. A menu-driven interface is one in which the user selects command choices from various menus displayed on the screen.

Web-Browser is a complex software program, resident in a client computer, that is capable of loading and displaying text and images and exhibiting behaviors as encoded in HTML (HyperText Markup Language) from the Internet, and also from the client computer's memory. Major browsers include MICROSOFT INTERNET EXPLORER, NETSCAPE, APPLE SAFARI, MOZILLA FIREFOX, and OPERA.

Web-Server is a computer able to simultaneously manage many Internet information-exchange processes at the same time. Normally, server computers are more powerful than client computers, and are administratively and/or geographically centralized. An interactive-form information-collection process generally is controlled from a server computer, to which the sponsor of the process has access.

Wireless Application Protocol ("WAP") is an open, global specification that empowers users with mobile wireless communication devices (such as mobile phones) to easily access data and to interact with Websites over the Internet through such mobile wireless communication device. WAP works with most wireless communication networks such as CDPD, CDMA, GSM, PDC, PHS, TDMA, FLEX, reflex, iDEN, TETRA, DECT, DataTAC, Mobitex and GRPS. WAP can be built on most operating systems including PalmOS, WINDOWS, CE, FLEXOS, OS/9, JavaOS and others.

WAP Push is defined as an encoded WAP content message delivered (pushed) to a mobile communication device which includes a link to a WAP address.

WiFi is wireless networking using the 802.11 communication standard from the IEEE (802.11 ac is the latest version) and transmitting at 2.4 GHz or 5 GHz.

There is a need for a system that provides an operator real-time quality information for a WiFi network.

BRIEF SUMMARY OF THE INVENTION

The Present Invention provides an operator real-time quality information of a WiFi network.

One aspect of the present invention is a system for providing WIFI operators real-time end-user WIFI quality information. The system comprises a mobile device comprising a mobile web browser, a WIFI network, an HTTP proxy engine, an application server comprising a scriptlet, and a management console. The WIFI network is configured to include the HTTP proxy engine in the transmission of a browsing activity of the mobile device. The application server injects the scriptlet into a content transferred to the web browser of the mobile device during the browsing activity. The scriptlet is configured to run in the background of the browsing activity and configured to periodically test a latency of HTTP requests from the mobile device to the application server to determine a quality of the WIFI network.

Another aspect of the present invention is a method for providing WIFI operators real-time end-user WIFI quality information. The method includes receiving at an application server on a WIFI network an HTTP request for content from a mobile communication device of an end-user. The method also includes receiving the resulting content at the application server. The method also includes injecting a scriptlet into the content transferred to a mobile web browser of the mobile communication device during a browsing activity. The method also includes monitoring a latency of HTTP requests from the mobile communication device into the application server to determine a quality of the WIFI network.

Having briefly described the present invention, the above and further objects, features and advantages thereof will be recognized by those skilled in the pertinent art from the following detailed description of the invention when taken in conjunction with the accompanying drawings.

DETAILED DESCRIPTION OF THE INVENTION

The present invention is a system for providing WiFi operators real-time end-user WiFi quality information. The quality information preferably comprises throughput (measured in Megabytes per second (Mbps)) of content delivery to a mobile web browser of a mobile communication device. The system provides real-time WiFi parameters at specific locations in a WLAN. The real-time quality of the WLAN as experienced by an end-user of a mobile communication device is provided to an operator via the web browser of the mobile communication device of the end user which is utilized as a monitoring device for monitoring the quality of the WLAN. When the mobile communication device connects to the WiFi network, and makes requests, the requests are routed through an HTTP Proxy. Each time the end-user of the mobile communication device requests resources from Internet from the mobile web browser the data is forwarded and passed back through the HTTP proxy to an application server which injects a scriptlet into the content returned to the mobile communication device from the Internet. The scriptlet is configured to run in the background and periodically test the latency of HTTP requests from the mobile communication device to the application server, thus determining the WiFi quality. The periodic latency tests preferably also inform the application server of the preceding test result as the scriptlet is performing the current test. The results are then displayed over time and geography on a management console, and/or used to alert IT staff when quality levels deteriorate to a predetermined threshold value.

In one example, an end-user opens a mobile web browser on a mobile communication device. The mobile communication device establishes a connection with the WLAN of a venue, preferably through a wireless access point ("wireless AP"). The end user then enters a URL to request content from a website over the Internet. The content is preferably a webpage of a website. An HTTP request is sent from the mobile web browser via the WLAN. The HTTP request preferably comprises an IP address of the mobile communication device, the content requested (URL), the browser and version used by the mobile communication device, the user agent profile of the mobile communication device, and cookies present. An HTTP Proxy engine on an application server forwards the request to the web address requested by the mobile device. The HTTP proxy retrieves the content from the targeted web address and a scriptlet is injected into the content by the application server. The modified content is then returned to returned to the mobile communication device. The scriptlet tests the latency of HTTP requests from the mobile communication device to the application server to analyze and report real-time WiFi quality of the WiFi network at the geographic location of the mobile communication device. The location is serviced by a wireless AP, which may or may not be over utilized by other mobile devices or too distant from the location of the mobile communication device. The location of the mobile communication device may be determined using triangulation of signals received at various wireless APs within the venue.

Figure 1:
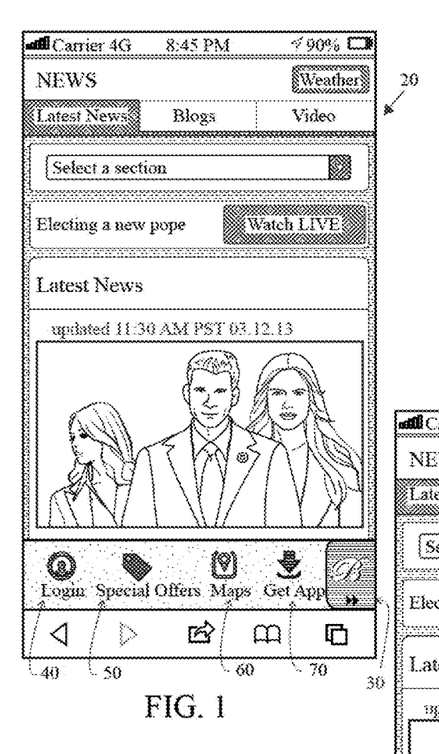
FIG. 1 is an image of a display screen of a mobile communication device.
Figure 1A:
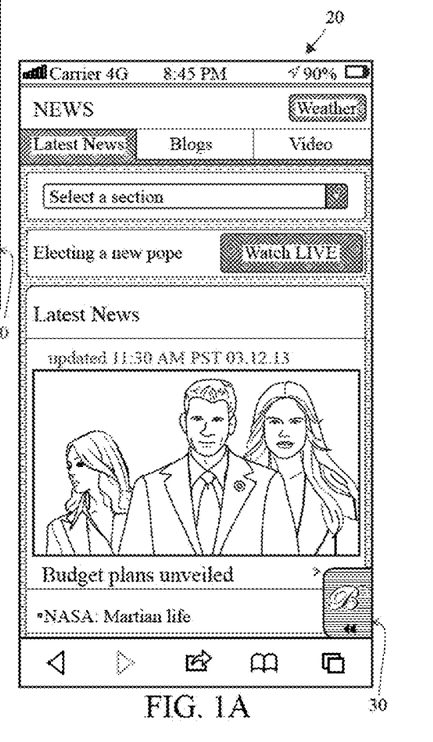
FIG. 1A is an image of a display screen of a mobile communication device.
Figure 2:
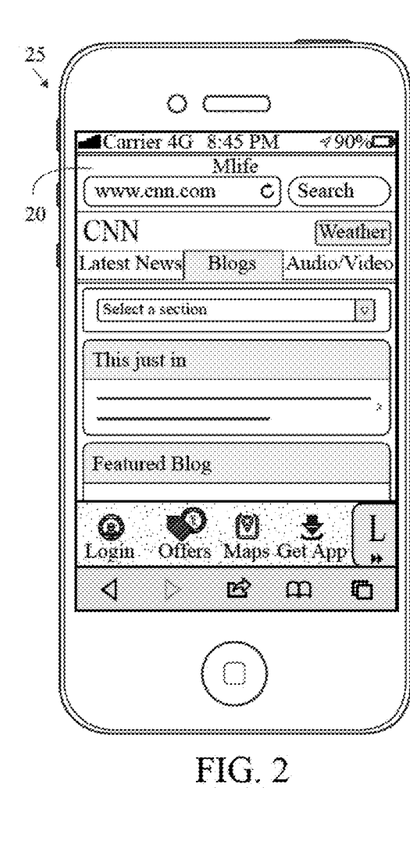
FIG. 2 is an image of a display screen of a mobile communication device.
Figure 2A:
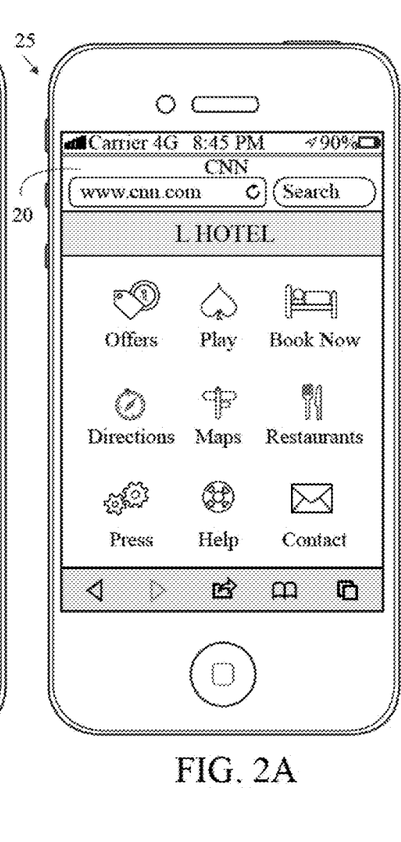
FIG. 2A is an image of a display screen of a mobile communication device.
Figure 2B:
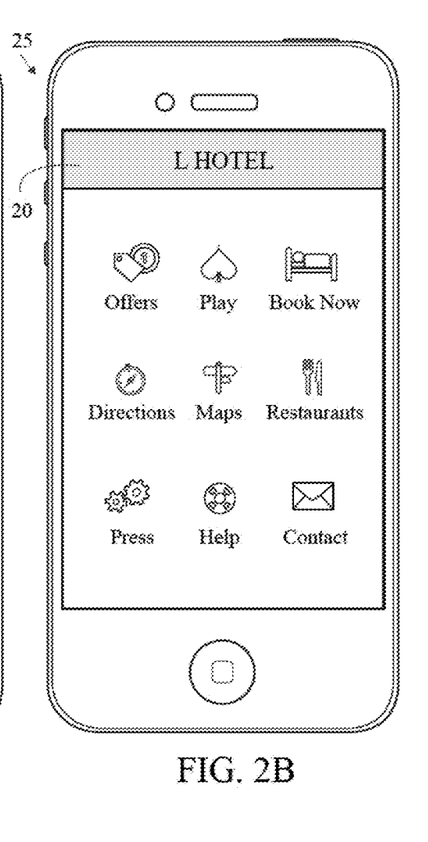
FIG. 2B is an image of a display screen of a mobile communication device.

As shown in FIGS. 1 and 1A, a mobile web browser of a mobile communication device 25 is illustrated on a display screen 20 of the mobile communication device 25. A venue dashbar tab 30 is displayed on the page of the browser, with a login button 40, special offers buttons 50, a maps button 60 and a get app button 70. As shown in FIG. 1A, the venue dashbar tab 30 can be toggled open or closed. The venue dashbar 30 is embedded into the mobile web browser. As shown in FIGS. 2, 2A and 2B, the UXD (user experience design) is unified across WiFi, mobile web, and native echannels for content and offers, regardless of the platform. FIG. 2 shows a WiFi application on the display screen 20 of a mobile communication device 25. FIG. 2A shows a web-based application on the display screen 20 of a mobile communication device 25. FIG. 2B shows a native application on the display screen 20 of a mobile communication device 25.

A mobile communication device 25 is capable of connecting to a local area network ("LAN") through a wireless AP 75 of a facility, through an Ethernet of the facility, and through a firewall of the facility. The facility has a server that connects to the Internet. An authentication service is configured to request patron input to associate the signature of the device with the identity of the patron, and a marketing content service is configured to translate the signature into a patron identity ("PID"). A third-party server is accessible over the Internet. A wireless AP 75 connects the WiFi server to the WiFi system. The server preferably communicates with the other services, such as Dynamic Host Configuration Protocol ("DHCP"), Remote Authentication Dial In User Service ("RADIUS"), authentication service, and marketing content service, and with the patron server through the WLAN. Communication with the remote server and the content server is through the Internet through the firewall. The mobile communication device 25 receives a signal from the wireless AP. The mobile communication device's 25 Media Access Control ("MAC") address is transmitted to the wireless AP and relayed to the DHCP server. A request for an IP address is sent from the device to the DHCP server through the WiFi service. The assigned IP address is associated with the MAC address at the DHCP server, and the IP address is forwarded to the device through the WiFi service. The mobile communication device 25 starts and makes the first HTTP request across the cellular/WiFi data network to a remote server. Included in the request is data such as the MAC address, the SSID, the IP address, and a PID.

Figure 11:
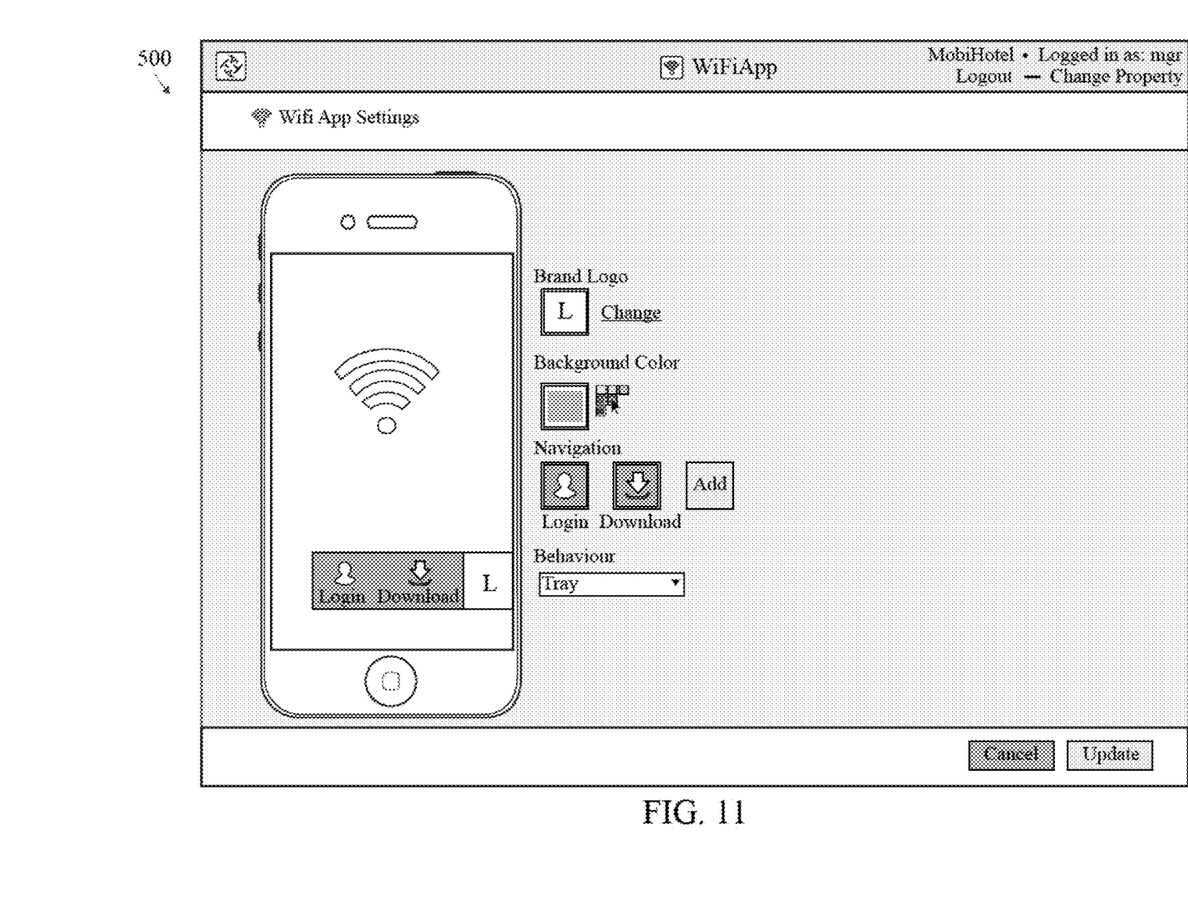
FIG. 11 is an image for a monitoring page on a display screen of a computer.

An application server preferably generates all layouts. FIG. 11 shows the WiFi management interface where the WiFi APP is create or edited 500. Offers are injected into Access GW, BBX, App, and MobileWeb. Email is managed with venue offer systems and paired with content by the application server. All of the content and offer page views are preferably correlated with either a MAC address for a device or a loyalty rewards club ID and recorded in GOOGLE ANALYTICs, corporate analytics or the like.

The mobile communication devices (host devices) utilized with the present invention preferably include mobile phones, smartphones, tablet computers, PDAs and the like. Examples of smartphones include the IPHONE® smartphone from Apple, Inc., BLACKBERRY® smartphones from Research In Motion, the DROID® smartphone from Motorola Mobility Inc., and many more. Examples of tablet computing devices include the IPAD® tablet from Apple Inc., and the XOOM™ tablet from Motorola Mobility Inc.

Figure 3:
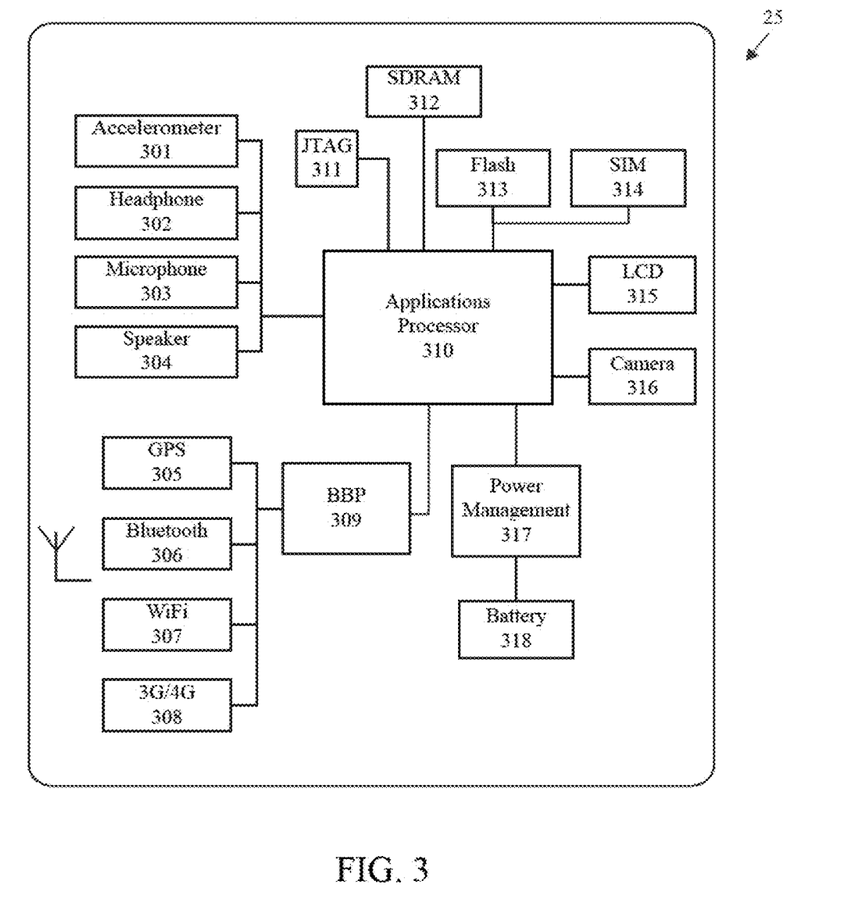
FIG. 3 is a block diagram of components of a mobile communication device.

As shown in FIG. 3, a typical mobile communication device includes an accelerometer 301, a head phone 302, a microphone 303, a speaker 304, a GPS chipset 305, a Bluetooth component 306, a WiFi component 307, a 3G/4G component 308, a BaseBand Processor (for radio control) 309, an applications processor 310, JTAG (debugger) 311, SDRAM memory 312, Flash memory 313, SIM card 314, LCD display 315, a camera 316, a power management circuit 317 and a battery or power source 318.

Figure 3A:
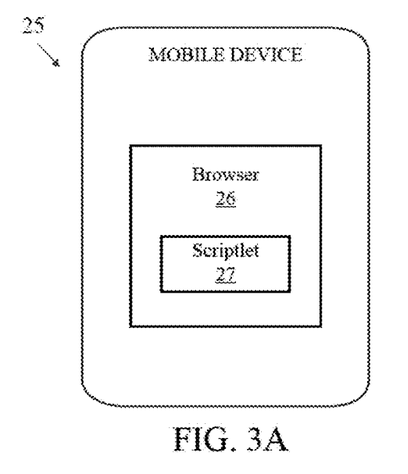
FIG. 3A is a block diagram of a mobile communication device illustrating a web browser and scriptlet.

As shown in FIG. 3A, the mobile communication device 25 has a mobile web browser 26, which when used with the system of the present invention has a scriptlet 27 which that is configured to run passively during browsing activity and configured to periodically perform latency tests, such as timing HTTP requests between the mobile device and the application server to determine a quality of the WIFI network. The scriptlet is injected into content transferred from the Internet to the mobile browser of a mobile communication device. The scriptlet allows the mobile communication device 25 to act like a monitoring device for the WiFi network. However, the mobile communication device 25 is preferably unaware that the scriptlet is monitoring the WiFi network using the mobile web browser of the mobile communication device 25.

Each of the interface descriptions preferably discloses use of at least one communication protocol to establish handshaking or bi-directional communications. These protocols preferably include but are not limited to XML, HTTP, TCP/IP, Serial, UDP, FTP, Web Services, WAP, SMTP, SMPP, DTS, Stored Procedures, Import/Export, Global Positioning Triangulation, IM, SMS, MMS, GPRS and Flash. The databases used with the system preferably include but are not limited to MSSQL, Access, MySQL, Progress, Oracle, DB2, Open Source DBs and others. Operating system used with the system preferably include Microsoft 2010, XP, Vista, 2000 Server, 2003 Server, 2008 Server, Windows Mobile, Linux, Android, Unix, I series, AS 400 and Apple OS.

The underlying protocol at a server, is preferably Internet Protocol Suite (Transfer Control Protocol/Internet Protocol ("TCP/IP")), and the transmission protocol to receive a file is preferably a file transfer protocol ("FTP"), FTP over SSL ("FTPS"), Hypertext Transfer Protocol ("HTTP"), Secure Hypertext Transfer Protocol ("HTTPS") or other similar protocols. The transmission protocol ranges from SIP to MGCP to FTP and beyond. The protocol at the server is preferably HTTPS.

A mobile communication service provider (aka phone carrier) of the customer such as VERIZON, AT&T, SPRINT, T-MOBILE, and the like mobile communication service providers, provide the communication network for communication to the mobile communication device of the end user.

Figure 4:
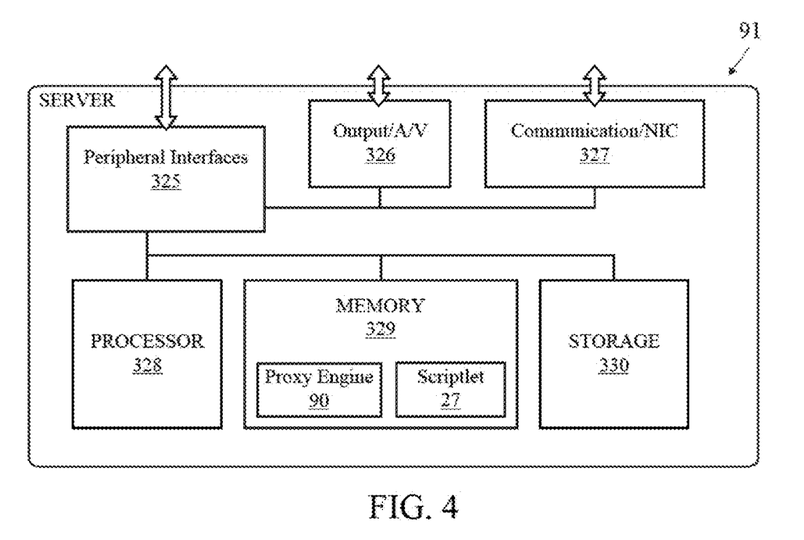
FIG. 4 is a block diagram of components of a server.

As shown in FIG. 4, an application server 91 preferably comprises a HTTP proxy engine 90 and scriptlet 27 in a system memory 329. The application server 91 also preferably comprises a processor 328, a storage 330, peripheral interfaces 325, an output controller and ports (such as audio and visual) 326 and a communication controller and ports, such as NIC (network interface card) 327.

Those skilled in the pertinent art will recognize that more or less components may be utilized with the application server 91 of the present invention.

Figure 5:
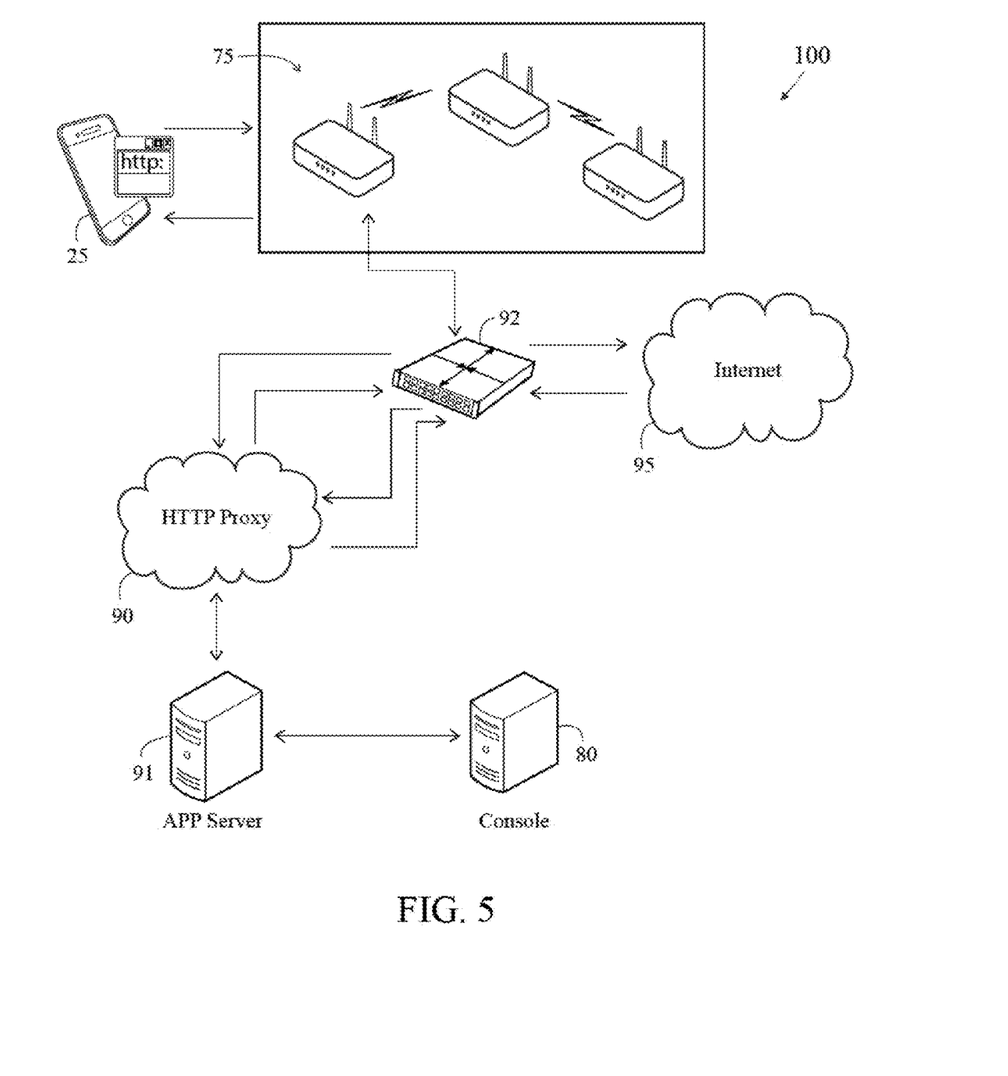
FIG. 5 is a block diagram of a system for providing WiFi operators real-time end-user WiFi quality information.

A system 100 for providing WIFI operators real-time end-user WIFI quality information is shown in FIG. 5. The system 100 includes multiple wireless AP 75 located throughout a venue, which are part of a WiFi network. A controller 92 receives and transmits communications from the wireless APs 75. The controller 92 also receives and transmits communications from the Internet 95. The controller 92 also receives and transmits communications from an application server 91, a management console 80 and an HHTP proxy engine 90. Multiple mobile communication devices 25 access the WiFi network using a mobile browser.

The application server 91 preferably comprises a scriptlet, which is a Javascript code that is configured to run in the background of the browsing activity and configured to periodically test a latency of HTTP requests from the mobile device to the application server to determine a quality of the WIFI network. The scriptlet is injected into content transferred from the Internet to the mobile browser of a mobile communication device. The scriptlet allows the mobile communication device 25 to act like a monitoring device for the WiFi network. However, the mobile communication device 25 is preferably unaware that the scriptlet is monitoring the WiFi network using the mobile web browser of the mobile communication device 25.

Figure 9:
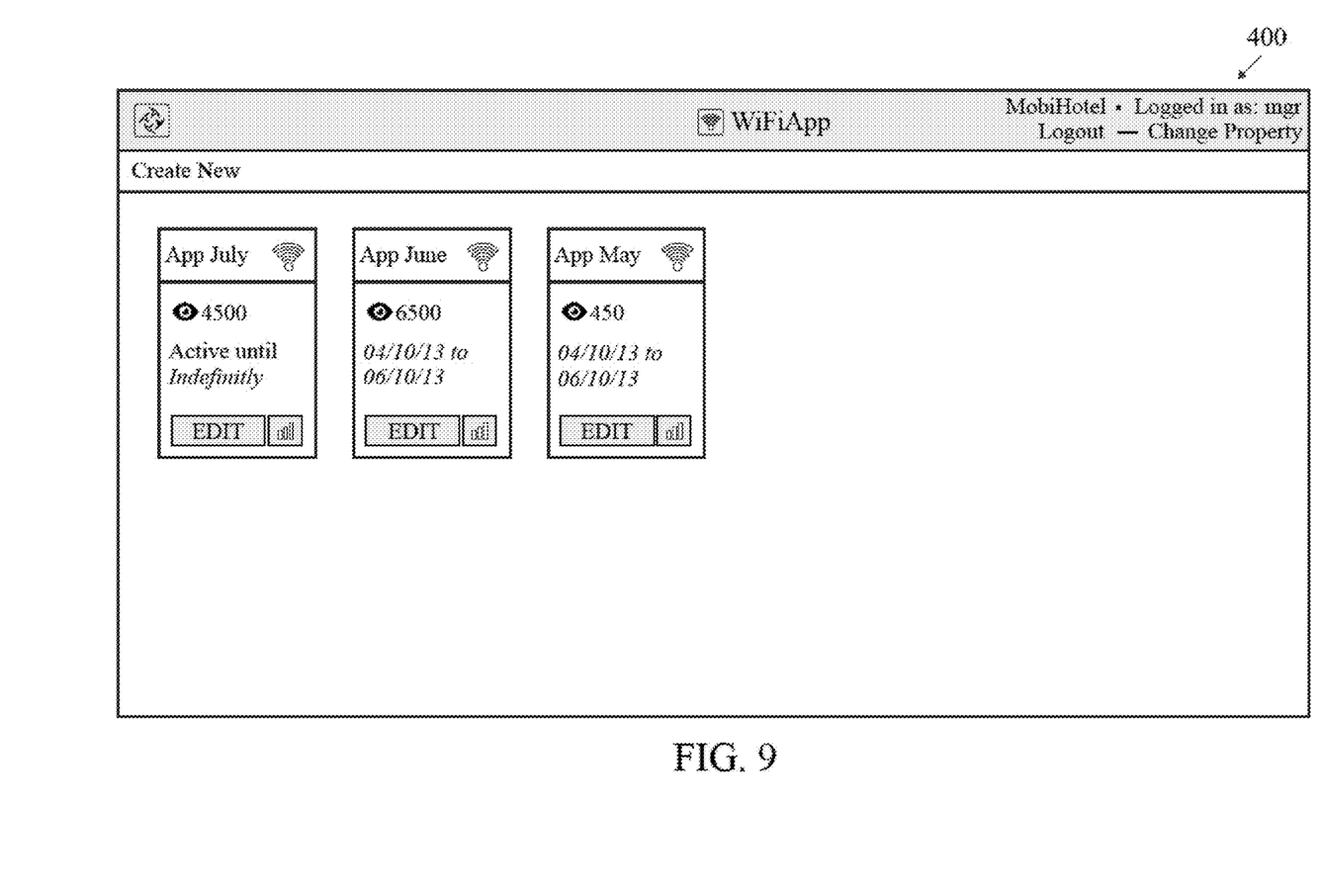
FIG. 9 is an image for a monitoring page on a display screen of a computer.
Figure 10:
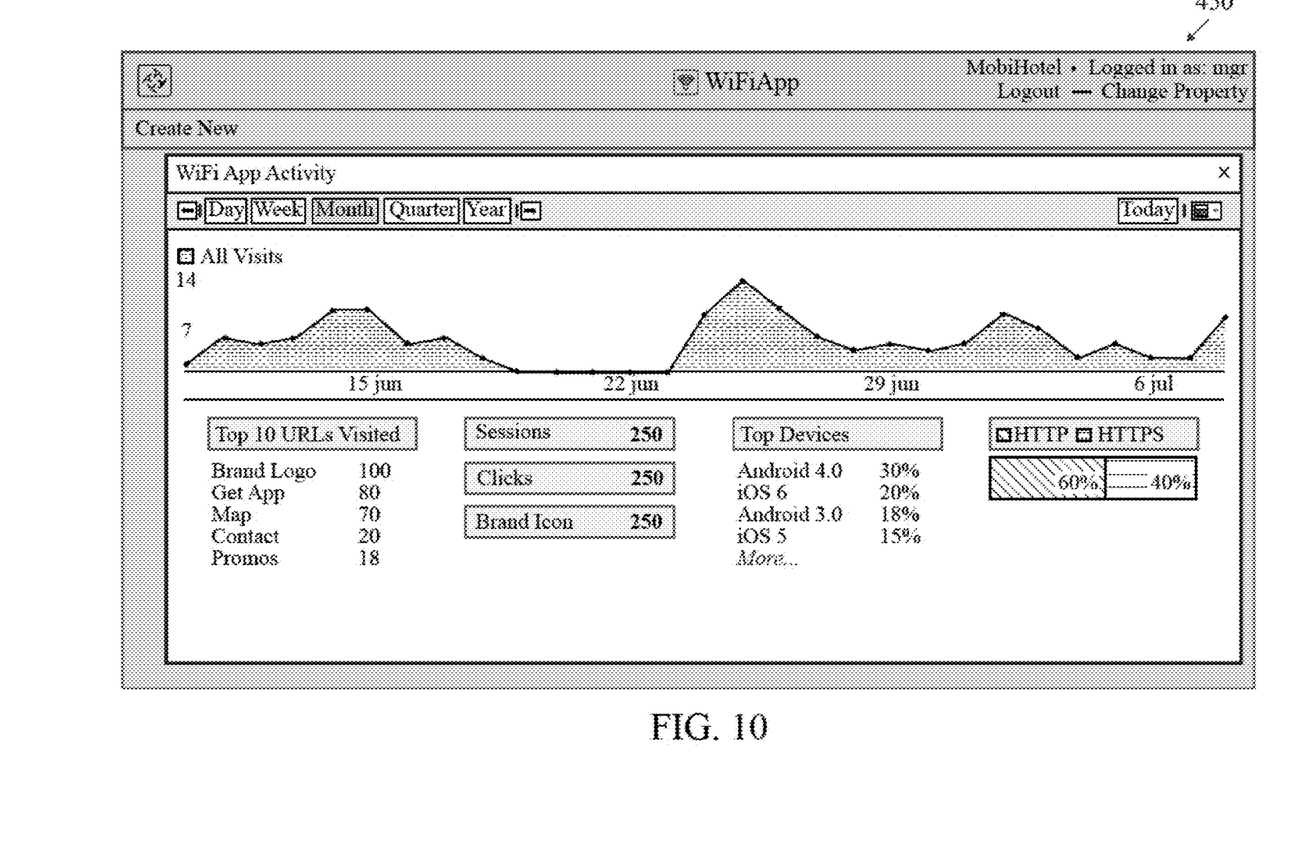
FIG. 10 is an image for a monitoring page on a display screen of a computer.

The periodic tests performed by the scriptlet is used in analytics, also informing the application server 91 of the preceding result as the scriptlet is performing a current test. The periodic tests are displayed over time and geography on the management console 80. FIG. 10 shows an example of a wiFiAPP interface 450 displaying WiFiApp activity that can be displayed on the management console. The periodic tests are preferably used to alert operators if quality levels of the WIFI network deteriorate to a predetermined threshold value. FIG. 9 shows an example of a WiFiAPP interface 400 displaying a list of WiFi APPs on a monthly basis.

The venue is preferably a casino resort, a mall or a grocery store. Alternatively, the venue is an airport, a train station, an amusement park, or a business campus. A system includes a venue comprising multiple wireless APs 75.

Figure 6:
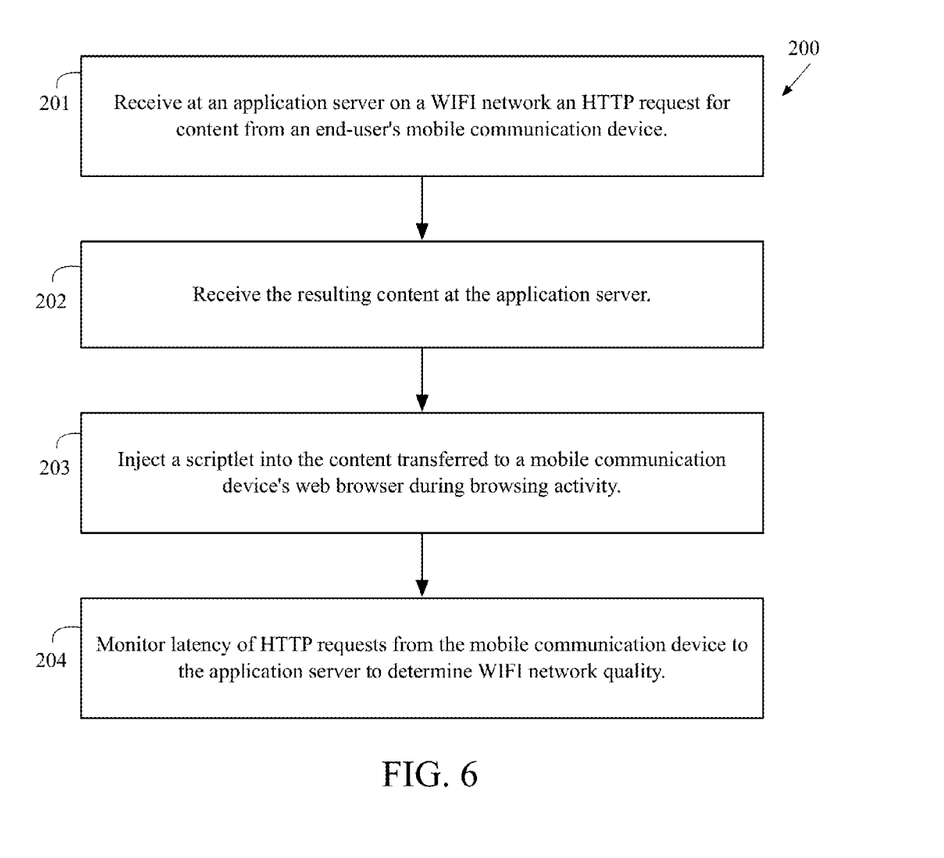
FIG. 6 is a flow chart for a method for providing WiFi operators real-time end-user WiFi quality information.

A flow chart of a method 200 for providing WIFI operators real-time end-user WIFI quality information is illustrated in FIG. 6. At block 201, an application server, performing web proxy services, on a WIFI network receives an HTTP request for content from a mobile communication device of an end-user. At block 202, the requested content is received by the web proxy at the application server. At block 203, a scriptlet is injected into the content transferred to a mobile web browser of the mobile communication device during a browsing activity. At block 204, the latency of HTTP requests from the mobile communication device to the application server is monitored to determine a quality of the WIFI network.

Figure 7:
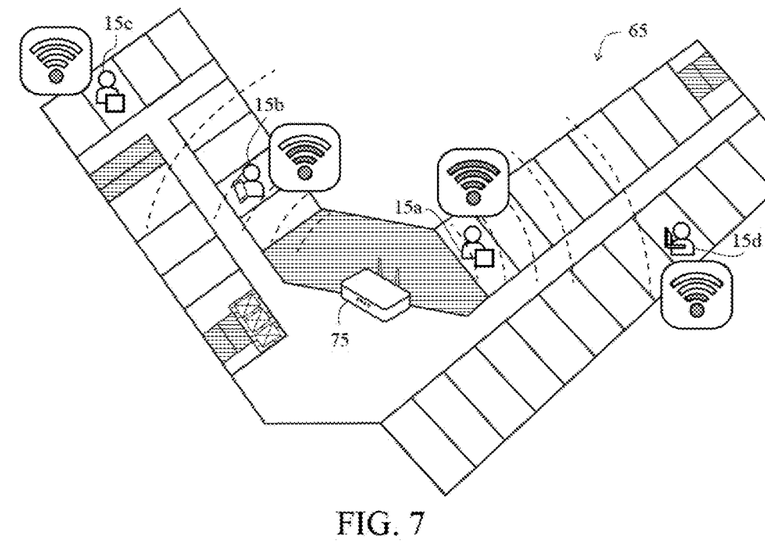
FIG. 7 is a map of a portion of a venue with WiFI end-users.
Figure 7A:
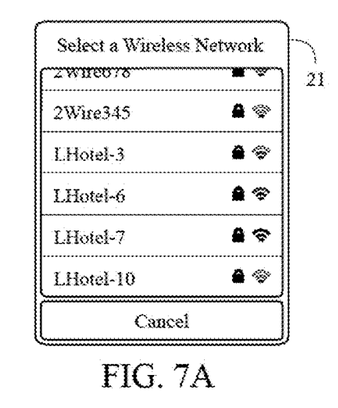
FIG. 7A is an illustration of a menu of WiFI access points at the venue of FIG. 7.

FIGS. 7 and 7A show different factors that affect the quality of a WiFi network. A floor plan 65 of a venue is illustrated in FIG. 7. A plurality of end-users 15a, 15b, 15c and 15d each have a mobile communication device 25, and each end user 15 is accessing a WiFi network of the venue through a wireless AP 75. Each end user 15 experiences different qualities of the WiFi network. Location of a transmitter in relation to the receiver is one aspect that affects the quality of the network. User 15a and 15b will experience a better quality of transmission of content over the WiFi network than user 15d or 15c. FIG. 7A illustrates an example of a wireless network selection menu 21 showing signal strength, which depends on several variable conditions including distance of the nearby wireless APs on a mobile communication device 25. If the wireless network connection has a low signal strength, the transfer of data will be impacted.

Figure 8:
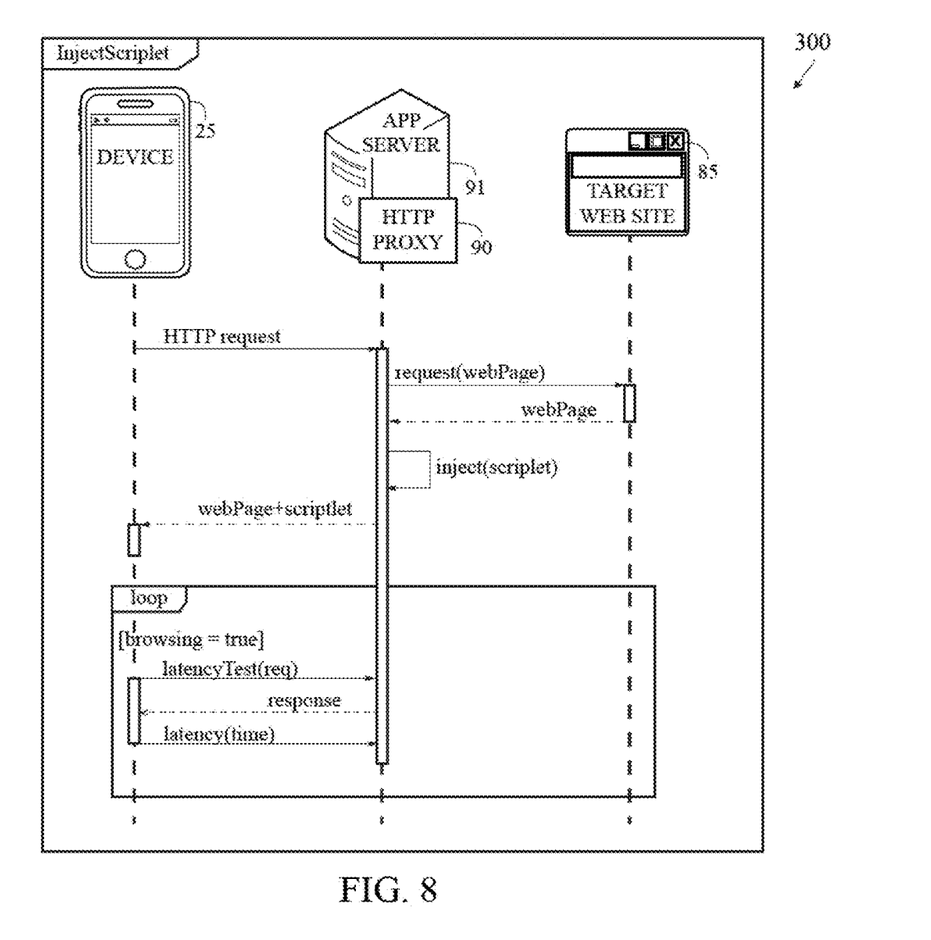
FIG. 8 is a sequence diagram for providing WiFi operators real-time end-user WiFi quality information.

A communications sequence diagram for providing WIFI operators real-time end-user WIFI quality information is illustrated in FIG. 8. An end user opens a mobile web browser on a mobile communication device 25 and generates an HTTP request for a web page, which is transmitted over a WiFi network through a wireless AP 75 to an HTTP proxy 90 on an application server 91. The HTTP request is forwarded from the HTTP proxy 90 over the Internet to a targeted web site 85 to retrieve the requested web page. The requested web page is sent back to the HTTP proxy 90 and the application server 91 injects a scriptlet into the content prior to returning the requested content to the mobile communication device over the WiFi network. The scriptlet periodically tests a latency of HTTP requests from the mobile device 25 over the WiFI network to the application server 91 and sends the latency results back to the application server 91 to determine a quality of the WiFi network at various locations of a venue.

The system 100 allows an operator to determine if a particular geographic location of a venue provides an adequate WiFi connection to a mobile communication device 25. Further, the system provides an operator with quality information to determine if a geographic location is constantly below a threshold WiFi connection standard, or only temporarily below a threshold WiFi connection standard as established by the venue. Network throughput measures the amount of data successfully transmitted, between two locations in a data network, usually not including header, footer or routing information bits. It is generally measured in bits per second (bps). Maximum theoretical WiFI throughput usually occurs between 150 Mbps to 450 Mbps.

In an alternative embodiment, the HTTP proxy 90 is located on a wireless AP 75 of the WiFi network.

Data communication network analysis can include, but is not limited to, certain measurements: throughput, bandwidth, quality of service, dropped packet rate, packet latency, round trip time, propagation delay, transmission delay, processing delay, queuing delay, network capacity, packet jitter, bit error rate, packet error rate, and frame error rate. The present invention may be utilized with a marketing system such as disclosed in Boyle et al., U.S. patent application Ser. No. 13/671,538, filed on Nov. 7, 2012, for a Method And System For Personalized Venue Marketing, which is hereby incorporated by reference its entirety. The present invention may be utilized with a gaming system such as disclosed in Boyle, U.S. patent application Ser. No. 13/769,376, filed on Feb. 13, 2013, for a System And Method For Managing Games In A Mobile Virtual Casino, which is hereby incorporated by reference its entirety. The present invention may be utilized with a gaming system such as disclosed in Boyle, U.S. patent application Ser. No. 13/756,591, filed on Jan. 31, 2013, for a System And Method For Virtual Currency In A Virtual Casino, which is hereby incorporated by reference its entirety. The present invention may be utilized with a gaming system such as disclosed in Boyle, U.S. patent application Ser. No. 13/789,686, filed on Mar. 8, 2013, for a System And Method For Secure Play In A Mobile Virtual Casino, which is hereby incorporated by reference its entirety. The method and system of the present invention may be utilized with an anonymous loyalty program such as described in Boyle, U.S. patent application Ser. No. 13/620,720, filed on Sep. 15, 2012, for an Anonymous Rewards Club Program, which is hereby incorporated by reference in its entirety. The method and system of the present invention may be utilized with the system described in Boyle et al., U.S. patent application Ser. No. 13/783,346, filed on Mar. 3, 2013, for a Method And System For Detection And Correction of WiFI Login Failure, which is hereby incorporated by reference in its entirety. The method and system of the present invention may be utilized with the system described in Greer et al., U.S. patent application Ser. No. 13/775,226, filed on Feb. 24, 2013, for a Segmented Architecture Method And System, which is hereby incorporated by reference in its entirety. The method and system of the present invention may be utilized with the system described in Boyle, U.S. patent application Ser. No. 13/844,585 filed on Mar. 15, 2013, for a Method And System For Freemium WiFi Service, which is hereby incorporated by reference in its entirety. The method and system of the present invention may be utilized with the system described in Boyle, U.S. patent application Ser. No. 13/843,627 filed on Mar. 15, 2013, for a Method And System For Incentivizing On-Site Participation In Games And Offers which is hereby incorporated by reference in its entirety. The method and system of the present invention may be utilized with the system described in Boyle, U.S. Patent Application No. 61/827,013 filed on May 23, 2013, for a Method And System For Including Content In A WiFi Stream, which is hereby incorporated by reference in its entirety.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes modification and substitutions of equivalents may be made therein without departing from the spirit and scope of this invention which is intended to be unlimited by the foregoing except as may appear in the following appended claim. Therefore, the embodiments of the invention in which an exclusive property or privilege is claimed are defined in the following appended claims.

We claim as our invention the following:

1. A system for providing WIFI operators real-time end-user WIFI quality information, the system comprising:
   a mobile device comprising a mobile web browser;
   a WIFI network;
   a HTTP proxy engine;
   an application server comprising a scriptlet; and
   a management console;
   wherein the WIFI network is configured to include the HTTP proxy engine in the transmission of a browsing activity of the mobile device;
   wherein the application server injects the scriptlet into a content transferred to the web browser of the mobile device during the browsing activity; and
   wherein the scriptlet is configured to run in the background of the browsing activity and configured to periodically tests a latency of HTTP requests from the mobile device into the application server to determine a quality of the WIFI network.

2. The system according to claim 1 wherein the plurality of periodic tests performed by the scriptlet also informs the application server of the preceding result as the scriptlet is performing a current test.

3. The system according to claim 1 wherein the periodic tests are displayed over time and geography on the management console.

4. The system according to claim 1 wherein the periodic tests are used to alert operators if quality levels of the WIFI network deteriorate to a predetermined threshold value.

5. The system according to claim 1 wherein HTTP proxy engine is located on the application server.

6. The system according to claim 1 wherein HTTP proxy engine is located on an access point of the WiFi Network.

* * * * *